No. 821,209. PATENTED MAY 22, 1906.
C. L. WAGANDT.
DAMPER.
APPLICATION FILED MAR. 27, 1905.
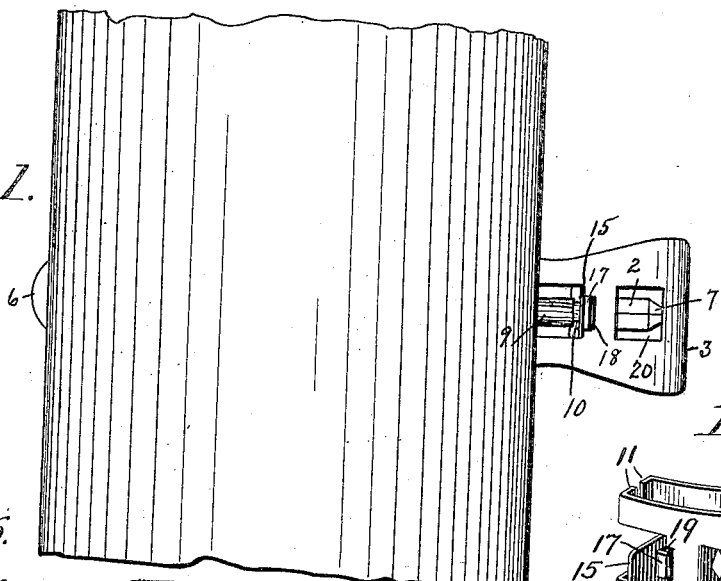
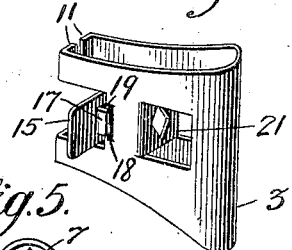
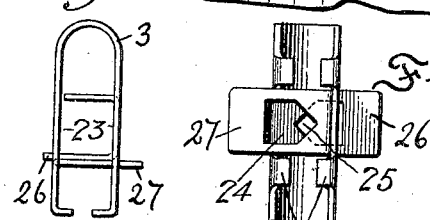
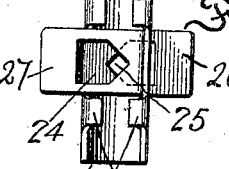
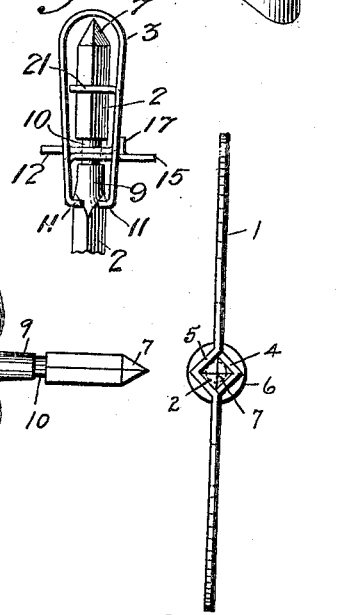
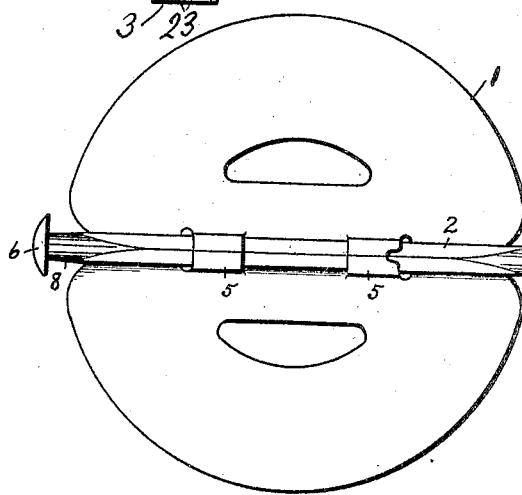
Witnesses:
Alverta Ferguson.
Mabel S. Ferguson.
Inventor
Charles L. Wagandt
By Chapin Ferguson
Attorney

UNITED STATES PATENT OFFICE.

CHARLES L. WAGANDT, OF BALTIMORE, MARYLAND, ASSIGNOR TO NATIONAL ENAMELING & STAMPING COMPANY, A CORPORATION OF NEW JERSEY.

DAMPER.

No. 821,209.

Specification of Letters Patent.

Patented May 22, 1906.

Application filed March 27, 1905. Serial No. 252,179.

*To all whom it may concern:*

Be it known that I, CHARLES L. WAGANDT, a citizen of the United States, residing at Baltimore, in the State of Maryland, have invented a new and useful Damper, of which the following is a specification.

This invention relates to improvements in dampers.

The objects of the invention are to provide a simple and efficient means for securing the damper within the pipe, to construct the damper in such a manner as to permit of its ready attachment to or detachment from the rod and to cause it to revolve with the said rod when attached thereto, to provide a rod of such a construction as to permit of its being forced through the sides of the pipe to form its own bearing and at the same time present a neat and finished appearance when in position in the pipe, and to provide a handle of such a construction as to permit of its ready attachment to or detachment from the outer end of the rod and to impinge against the pipe creating tension sufficient to hold the damper in any position to which it may be turned.

Other features of the invention will be fully set forth in the following specification and pointed out in the claims.

In the accompanying drawings, Figure 1 is a side elevation of a portion of a pipe, showing my improved damper attached thereto. Fig. 2 is a detailed plan view of the damper and its rod. Fig. 3 is an edge view of the damper and rod as shown by Fig. 2. Fig. 4 is a perspective view of the handle. Fig. 5 is a plan view of the handle locked upon the end of the rod, the latter being broken away. Figs. 6 and 7 are modifications of the handle.

Similar reference-numerals designate like parts throughout the several views of the drawings.

Referring to the accompanying drawings, forming part of this specification, 1 designates the damper, 2 the rod upon which the damper is secured, and 3 the handle. The damper 1 is formed of sheet metal and stamped with a V-shaped depression 4 on one side and two or more corresponding depressions 5 5 on the opposite side, thus forming a square aperture through which the square rod 2 projects, which causes the damper to revolve with the said rod. The rod 2 is square in cross-section and formed with a head 6, on one end to give a neat finished appearance when in position in the pipe, and a pointed end 7, which serves to cut an opening in the side walls of the pipe to form a bearing for the said rod. The rod 2 is rounded sufficiently at 8 and 9 to permit of its revolving in the square apertures formed in the side walls of the pipe by forcing the said rod threethrough. Near the outer end thereof the rod 2 is provided with a shoulder 10, the purpose of which will presently appear. The handle 3 is formed of resilient sheet metal having the ends turned back parallel with each other and the extremities 11 bent at right angles thereto. One of the ends of the said handle 3 is cut out, and the cut-out portion 12 is bent at right angles and projects through an opening 13 in the other side of the handle. This projection 12 is provided with an aperture 14, approximately V-shaped at one side. The other end of the handle 3 is provided with an opening 13, and the metal projection 15 cut out to form this opening is bent at right angles and projects across the handle in front of the projection 12. This projection 15 is provided with an aperture 16, approximately V-shaped on one side, and the metal at the rear of the projection 15 is bent back at right angles to form a locking-shoulder 17. One side of the handle 3 is cut out at 18 to form a straight edge 19, against which the locking-shoulder 17 impinges when the handle is locked on the rod 2. In one side of the handle 3 is an opening 20, and the metal cut out to form this opening is bent at right angles, forming a projection 21, which latter is provided with a square aperture 22 in line with the apertures 14 and 16. The square outer end of the rod 2 projects through this aperture 22 when the handle is locked on the rod, which causes the rod, and consequently the damper 1, to revolve when the handle is revolved. The handle is placed upon the rod 2 parallel with the damper 1, so that the position of the latter in the pipe may at all times be seen. When the handle 3 is in position on the rod 2, the projections 12 and 15 are locked against the shoulder 10 and the rounded outer end of the said handle projects beyond and around the outer pointed end of the rod 2.

The operations of securing the parts to the pipe are as follows: The end of the rod 2 is forced through one side of the pipe and then run between the depressions 4 and 5 and then forced through the opposite side wall of the pipe until the head 6 impinges against the outer side of the said pipe. The handle 3 being in the unlocked position is then slipped over the outer end of the rod 2 in a position parallel with the damper, the end of the said rod 2 projecting through the apertures 14, 16, and 22. The ends of the handle 3 are then forced together until the locking-shoulder 17 springs over the edge 19, thus bringing the V-shaped sides of the apertures 14 and 16 close together and locking the projections 12 and 15 against the shoulder 10. The square outer end of the rod 2 projecting through the square aperture 22 in the projection 21 will cause the rod 2, and consequently the damper 1, to revolve with the handle 3. The ends of the handle impinge against the sides of the pipe, causing sufficient tension to retain the damper in any position to which it may be set. It will be seen that the handle 3 being open between the sides and formed with a number of openings permits the air to pass between the parts and keep the said handle cool at all times.

In Figs. 6 and 7 I have shown a modification of the handle. In this modification the tendency of the ends 23 23 is to spring apart, and the apertures 24 and 25 have the approximately V-shaped sides arranged opposite to those of the other figures. The square openings formed by said V-shaped sides of the apertures become smaller when the sides 23 23 spring apart. Therefore when the square end of the rod 2 is forced into the square opening the said ends 23 23 will be drawn together until the shoulder 10 of the rod 2 passes the projections 26 and 27, when they will spring back of said shoulder and lock the handle on the rod.

Having thus described my invention, what I claim is—

1. The combination of a damper, a rod upon which the damper is secured having a shoulder near one end, and a handle comprising a body portion having two projections bent at right angles to the body portion and overlapping each other and each provided with an aperture through which the rod projects.

2. The combination of the damper, a rod upon which the damper is secured having a shoulder near one end, and a handle having two overlapping projections each provided with an aperture through which the rod projects and adapted to lock the handle upon the rod.

3. The combination of the damper, a rod square in cross-section having a shoulder near one end, and a handle having two overlapping projections each provided with an aperture through which the rod projects adapted to lock the handle upon the rod.

4. The combination of the damper, a rod square in cross-section having a shoulder near one end, and a handle having two projections each provided with an aperture through which the rod projects, one of said projections being provided with a locking-shoulder adapted to lock the said projections against the shoulder on the rod.

5. The combination of the damper, a rod square in cross-section having a shoulder near one end, a handle having two projections each provided with an aperture through which the rod projects and adapted to lock the handle upon the rod, and a projection provided with a square aperture through which the square end of the said rod projects, whereby when the handle is turned the rod, and consequently the damper, will also be turned.

6. The combination of the damper, a rod square in cross-section having a head on one end and a pointed opposite end, a shoulder near one end, and rounded at the two points which rest upon the sides of the pipe, a handle having two projections each provided with an aperture through which the rod projects and adapted to lock the handle upon the rod, and a projection provided with a square aperture through which the square end of the rod projects, whereby when the handle is turned the rod, and consequently the damper, will also be turned.

In testimony whereof I have signed my name to this specification in the presence of two subscribing witnesses.

CHARLES L. WAGANDT.

Witnesses:
CHAPIN A. FERGUSON,
LOUIS P. STHIRTRATER.